Oct. 23, 1945.  A. B. SIBERT  2,387,415
FLUID TRANSMISSION
Filed Sept. 5, 1942  4 Sheets-Sheet 2

INVENTOR.
ALFRED B. SIBERT.
BY Oltsch & Knoblock
Attorneys.

Oct. 23, 1945.  A. B. SIBERT  2,387,415
FLUID TRANSMISSION
Filed Sept. 5, 1942  4 Sheets-Sheet 3

INVENTOR.
ALFRED B. SIBERT.
BY Oltsch & Knoblock
Attorneys.

Oct. 23, 1945.  A. B. SIBERT  2,387,415

FLUID TRANSMISSION

Filed Sept. 5, 1942  4 Sheets-Sheet 4

INVENTOR.
ALFRED B. SIBERT.
BY Altach & Knoblock
Attorneys.

Patented Oct. 23, 1945

2,387,415

UNITED STATES PATENT OFFICE 2,387,415

FLUID TRANSMISSION

Alfred B. Sibert, Rochester Township, Fulton County, Ind.

Application September 5, 1942, Serial No. 457,499

7 Claims. (Cl. 60—54)

This invention relates to a fluid transmission, and more particularly to a hydraulic transmission forming a driving connection between a driving and a driven member.

Various types of fluid drive couplings and converters have been designed and used for different installations presenting various operating conditions. These devices have generally fallen into one or the other of two types which I will refer to as the torque multiplying or converter type and the unit ratio or coupling type, respectively. The converter type, of which the Föttinger converter is an example, is adapted primarily for applications where a speed differential is desired between a high speed driving member and a comparatively low speed driven member. The converter type is efficient only in applications for which it is particularly designed and lacks flexibility of application. The coupling type is adapted for applications where substantially equal speed of rotation of both driving and driven members is desired. The coupling type is subject to a condition wherein starting torque is small, and efficiency is low until the driven member has attained substantial speed. Both types depend upon kinetic energy for power transmission.

Certain applications for fluid drive transmissions present a variety of operating conditions and problems which neither of the above types is capable of meeting successfully, taken alone. For example, an automotive vehicle requires both torque multiplication and unit ratio transmission characteristics. Thus it has heretofore been customary to employ mechanical transmission devices in conjunction with a fluid coupling or converter in automotive applications, to satisfy the different requirements. However, these combined hydraulic-mechanical devices are too expensive for use on vehicles in the medium and low price classes, are objectionably complicated and therefore difficult to repair, and the operation of the mechanical devices introduces operating characteristics which may detract from or counteract the advantageous features, such as the smoothness of operation, of the fluid coupling.

The primary object of this invention is to provide a fluid drive transmission which overcomes the deficiencies, limitations and objections above mentioned and satisfies the requirements for automotive application.

A further object is to provide a fluid drive transmission having various stages or positions, including one or more torque multiplication stages and a unit ratio stage, in which it may be selectively conditioned or adjusted.

A further object is to provide a device of this character which is simple in construction, easy to assemble, and comparatively inexpensive.

A further object is to provide a device of this character having smooth operating characteristics at all times.

A further object is to provide a device of this character having a neutral stage at which the kinetic energy flow of liquid incident to rotation of the driving member is stopped.

A further object is to provide a device of this character having a plurality of stages or positions for effecting torque multiplying forward drive, torque multiplying reverse drive, unit ratio forward drive, and a neutral stage in which no torque is transmitted while the driving member operates.

A further object is to provide a device of this character having multiple stages with individual driving characteristics for effecting drive in a given direction, with means for automatically selecting said stages in response to the torque requirements of the driven member.

A further object is to provide a device of this character having multiple stages with different torque characteristics for effecting drive in a given direction, with means responsive to the speed of the driven member for automatically adjusting the device at successive stages.

A further object is to provide a self-sufficient device of this character, with which no mechanical power transmission units or devices need be employed.

A further object is to provide a device of this character which may be manufactured principally from metal stampings.

Other objects will be apparent from the description and appended claims.

Referring to the drawings, which illustrate the preferred embodiment of the invention, the numeral 1 designates the driving shaft and numeral 2 designates the driven shaft, which shafts are preferably axially spaced and aligned, and may constitute respectively the crank shaft and the propeller shaft of an automotive vehicle. Drive shaft 1 preferably terminates in an integral enlarged head 3 to which an impeller hub 4 is fixedly and concentrically secured by bolts 5. An annular flange 6 projects from the inner face of hub 4 and encircles the forward end portion 7 of driven shaft 2, and a suitable thrust bearing 8 is interposed between flange 6 and shaft end 7.

An impeller 9 is mounted upon hub 4. Impeller 9 has an outer housing comprising an annular end wall 10 and a cylindrical outer wall 11. The inner periphery of end wall 10 is welded or otherwise fixedly secured to the periphery of hub 4 at 12 to provide a sealed joint therewith. A plurality of equi-spaced, radially and longitudinally arranged vanes 13, of generally L shape, are welded or otherwise secured at their outer margins to housing walls 10 and 11. An inner impeller frame comprising an annular end portion 14 and a cylindrical portion 15 is fixedly secured to the inner edges of the vanes 13. A ring 16 fits between cylindrical walls 11 and 15 at the end thereof, and is welded or otherwise fixedly secured thereto. The inner wall 15 has an annular opening 17, or an annular series of openings, formed therein adjacent ring 16. The inner diameter of inner annular wall 14 is of larger diameter than hub 4, and the inner end edges 18 of the vanes 13 incline forwardly and inwardly from the inner periphery of annular wall 14 to a point on outer annular wall 10 adjacent to hub 4.

An abutment ring 19 encircles driven shaft 2 and bears against the inner race of bearing 8. A sleeve 20 encircles the shaft 2 and bears against ring 19. The shaft 2, from a point adjacent the rear end of sleeve 20, is splined at 21. A sleeve 22 is splined on shaft 2, and adapted for free longitudinal sliding thereon. The forward end portion 23 of sleeve 22 is enlarged in both internal and external diameter, whereby an annular chamber is formed therein adapted to receive a coil spring 24. The forward end of coil spring 24 bears on ring 19, and the rear end of said spring bears upon shoulder 25 of sleeve 22. The coil spring 24 normally urges the sleeve 22 to its rearmost position illustrated in Fig. 1, against an annular abutment 26 fixed on shaft 2.

A plurality of radial arms 27 project outwardly from the forward end of portion 23 of sleeve 22 and fixedly mount a flat annular member 28 at their outer ends. Annular member 28 fixedly mounts a plurality of equi-spaced flat radially and longitudinally extending vanes 29. Vanes 29 extend forwardly from plate 28 and are preferably unequal in number to the impeller vanes 13. Vanes 29 preferably taper from their inner to their outer ends. A frusto-conical annular frame member 30 is fixedly secured to the front edges of vanes 29. The spacing of the outer or marginal portions of vane carrying members 28 and 30 is preferably equal to the width of annular passage 17 in the inner cylinder wall 15 of the impeller. The diameter of the vane assembly 28, 29, 30 is preferably smaller than the inner diameter of impeller wall 15 by an amount sufficient only for free relative rotation of said impeller and vane assembly.

The outer periphery of sleeve 22, from the enlarged portion 23 thereof rearwardly, is splined at 31, and an internally splined sleeve 32 is splined thereto. The forward end of sleeve 32 bears against the rear end of portion 23 of sleeve 22. A retainer ring 33 encircles sleeve 22 and is held in place by a split ring 34 seated in circumferential groove in sleeve 22. Retainer ring 33 bears against the rear end of sleeve 32 and cooperates with enlarged portion 23 of shaft 22 to hold sleeve 32 against longitudinal movement on sleeve 22.

A plurality of radial arms 35 project outwardly from the forward end of sleeve 32 and fixedly mount a flat annular member 36 at their outer ends. Member 36 fixedly mounts a circumferential series of equi-spaced, forwardly projecting curved vanes 37 adjacent its inner periphery. Vanes 37 extend generally radially and each faces in the same circumferential direction. Member 36 also fixedly mounts a circumferential series of equi-spaced, forwardly projecting curved vanes 38 adjacent its outer periphery. Vanes 38 extend generally radially and each faces in the same circumferential direction as and is preferably radially aligned with one of the vanes 37. Vanes 37 and 38 are preferably of approximately the same over-all dimensions, but may be of different curvatures; and they are radially spaced a distance approximately equal to or slightly more than their over-all radial dimension.

A thrust bearing 39 fits around the forward end of sleeve 32 and bears against a shoulder thereof adjacent the arms 35, and a complementary thrust bearing 40 fits around the rear end of sleeve 32 between a shoulder on said sleeve and a retainer ring 41 encircling said sleeve and suitably locked against longitudinal displacement in a rearward direction. A sleeve 42 encircles sleeve 32 and is journaled at its ends upon said bearings. A plurality of radial arms 43 project outwardly from the forward end of sleeve 42 in close spaced relation to arms 35, but maintained spaced therefrom sufficiently for rotative clearance by bearing 39. A substantially flat annular member 44 having the same outer diameter as member 28 is fixedly mounted on the outer ends of arms 43. The outer portion 45 of member 44 is of increased thickness and encircles the periphery of member 36 with a rotative clearance. The front face of portion 45 of member 44 preferably lies in the same plane as the front face of member 36. Portion 45 of member 44 fixedly mounts a circumferential series of equi-spaced, forwardly projecting curved vanes 46. Vanes 46 extend generally radially, have a slight rotative clearance with the outer edges of vanes 38, and each faces in a rotative or circumferential direction opposite vanes 37 and 38.

A rigid annular spacer or frame member, of the same outer diameter as members 28, 30 and 44, is fixedly secured to the forward edges of vanes 46. This spacer comprises an outer cylindrical portion 47 of a length equal to or slightly greater than the width of impeller passage 17, and front and rear annular members 48 and 49 whose inner diameter are substantially equal to the inner diameters of members 28, 30, 36 and 44. If desired, members 48 and 49 may be of frusto-conical form converging inwardly. Rear spacer member 49 fixedly mounts a circumferential series of equi-spaced, rearwardly projecting curved vanes 50. Vanes 50 extend generally radially, are positioned between and have a slight rotative clearance with vanes 37 and 38, and face in the same rotative direction as vanes 46. The spacing of at least the outer margin of spacer member 49 from the front faces of members 36 and 45 is preferably substantially equal to the axial dimension of impeller passage 17. The front edges of vanes 37 and 38 have a slight rotative clearance with spacer member 49, and the rear edges of vanes 50 have a like clearance with member 36.

The front spacer member 48 fixedly mounts one or more circumferential series of equi-spaced, forwardly projecting curved vanes, such as vanes 51 and 52, which are arranged in substantially longitudinal aligned relation to and face in the same circumferential direction as vanes 37 and 38, respectively. The forward edges of vanes 51 and 52 have a slight rotative clearance with annular member 28. Annular member 28 fixedly mounts two spaced circumferential series of equi-spaced, rearwardly projecting curved vanes 53 and 54 which are arranged in longitudinal alignment with and face in the same circumferential direction as vanes 46 and 50, respectively. Vanes 53 and 54 have slight rotative clearance with spacer member 48 and vanes 51 and 52. The spacing of member 28 from at least the outer margin of spacer member 48 is substantially equal to the axial dimension of impeller passage 17.

The free or rear end of the impeller is connected with a cup-shaped member cooperating therewith to form a fluid confining chamber housing the vane carrying assemblies above described. This member comprises a cylindrical portion 55 of the same diameter as inner impeller wall 15 and an annular rear wall 56. An outwardly projecting flange 57 is carried by the forward end of cylinder 55 and is bolted to end ring 16 of the impeller at 58. The inner periphery of end wall 56 is provided with a cylindrical enlargement 59 journaled on sleeve 42 and adapted for longitudinal sliding of sleeve 42 therein. Part 59 is provided with suitable inner sealing or packing rings to substantially retard leakage of liquid between the sleeve 42 and part 59.

The construction described above is mounted in a suitable housing. As here illustrated, the housing comprises a cylindrical portion 60 of a diameter slightly larger than the impeller and having an outwardly projecting annular flange 61 at its front end adapted for sealed attachment to a suitable closure (not shown) by means of bolts 62. It will be understood that this housing may be attached directly to an engine when used in an automotive vehicle. The cylindrical portion 60 of the housing merges with an annular inwardly projecting portion 63 at its rear, from whose inner portion projects a reduced diameter cylindrical portion 64. An annular end wall 65 is formed integrally with cylinder 64 and terminates in an outwardly projecting cylindrical portion 66 concentric with and of larger diameter than shaft 2. A bearing 67 and an oil seal 68 fit between the shaft 2 and portion 66.

A pair of diametrically opposed radial arms 69 project into the housing in substantial alignment with housing portion 63, and a pair of diametrically opposed outwardly projecting socket portions 70 are formed in housing wall 65 in longitudinal alignment with the inner ends of arms 69. A pair of parallel longitudinal shafts 71 are fixedly secured at their opposite ends in the arms 69 and sockets 70.

An inner frusto-conical clutch ring 72 is mounted on a supporting member 73 positioned rearwardly thereof and provided with a pair of parallel longitudinal guide sleeves 74 integral therewith and projecting therefrom. Sleeves 74 are longitudinally slidable on shafts 71. A pair of diametrically opposed ears 75 project forwardly from supporting member 73 intermediate sleeves 74 and in outwardly spaced relation to clutch ring 72. Ears 75 mount studs 76 to which are pivoted the ends of a yoke portion 77 of an operating lever 78. Lever 78 includes a circular or spherical portion 79 seated in a socket formed substantially centrally and at the upper portion of cylindrical housing portion 64. As here illustrated the socket comprises an outwardly off-set housing portion 80 and an inner retainer member 81 having opposed concentric openings formed therein to snugly receive lever portion 79. Lever 78 is provided with suitable means (not shown) for locking it in any selected position with relation to an indicator segment 82.

The rear end of sleeve 42 is splined and fixedly mounts the internally splined hub 83 of a support 84 mounting an outer clutch element 85 having an inner frustoconical clutch face adapted to cooperate with clutch element 72.

Figure 4:
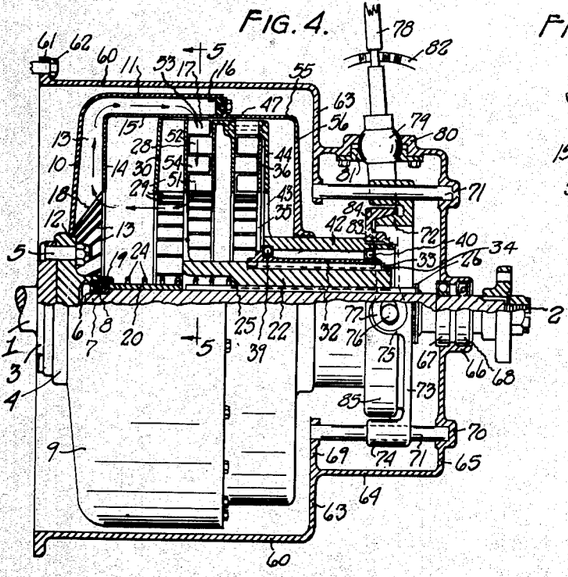
Fig. 4 is a longitudinal sectional view taken on line 4—4 of Fig. 5, and illustrating adjustment of the device in the torque multiplying forward drive stage.
Figure 5:
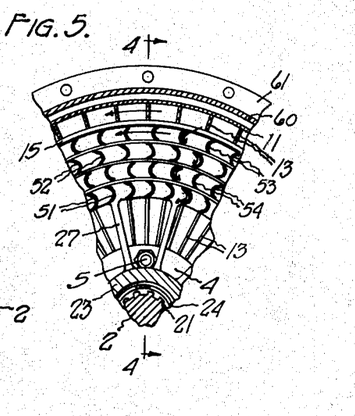
Fig. 5 is a fragmentary transverse sectional view taken on line 5—5 of Fig. 4.

The operation of the device will now be explained with reference to Figs. 1, 2, 4, 5, 6 and 7, assuming that the impeller casing is filled to a proper level, say two-thirds full, with a suitable liquid, and assuming application of the device to an automotive vehicle. When forward movement of the vehicle from a stationary starting position is desired, assuming that the drive shaft 1 is rotating, lever 78 is shifted to position the parts as illustrated in Fig. 4. Lever 78 serves to hold the inner clutch element 72 in selected position longitudinally of the device, and the spring 24 acts upon the concentric sleeves 22, 32 and 42 to urge the clutch element 85 into frictional clutching engagement with clutch element 72 and to position the vane assemblies in selected position longitudinally of the device. Thus, in Fig. 4, the vane assemblies will be positioned with the vanes 51, 52, 53 and 54 in coplanar relation or registration with impeller passage 17. As the impeller is rotated by drive shaft 1, liquid flows therethrough in the direction indicated by the arrows in Fig. 4, at a high velocity, and is discharged through impeller passage 17 for impact upon the outer vanes 53 which are positioned with their concave faces in counter-rotational direction. Vanes 53 transmit some of the torque applied thereto to the rotor in rotational direction and reverse the direction of the liquid flow from impingement thereof upon the oppositely facing concave faces of the next inner circumferential series of vanes 52. Vanes 52 are mounted upon the spacer 47, 48, 49 which is secured to member 44 mounted upon sleeve 42 to which clutch element 85 is splined, and consequently are held substantially stationary by the clutch. Vanes 52 again reverse the direction of liquid flow for impingement upon the next adjacent inner series of rotor vanes 54, etc. The driving force applied to the rotor vanes 53 and 54 acts in the same rotative direction as the rotation of the impeller, and is transmitted by member 28, arms 27 and splined sleeve 22 to driven shaft 2. Note that rotation of sleeve 22 and shaft 2 relative to sleeve 42 is accommodated by bearings 39 and 40. Hence, in this operative position or stage, the device serves to multiply the torque transmitted from the impeller to the rotor in substantially the same manner as in the Föttinger converter, which is well known in the art. The resulting operating characteristic of the device at this stage is a smooth starting action for quickly starting the driven shaft and bringing it to a predetermined low speed, as compared to the speed of the driving shaft. It will be understood that the speed ratio between the driving and driven shafts in this stage will depend upon the shape of the vanes, the number of series of rotor vanes, and other factors, so that the device may be designed to provide the operating characteristics desired. If necessary or desired, the device may be designed to provide two or more forward drive torque multiplication stages having different characteristics of torque multiplication and speed ratios for successive operation thereof in the same manner in which low and intermediate speed gear sets are provided in conventional mechanical automotive transmissions. Thus the device transmits a high starting torque to the driven shaft, and assures a quick get-away in an automotive application.

Figures 1, 2, 3:
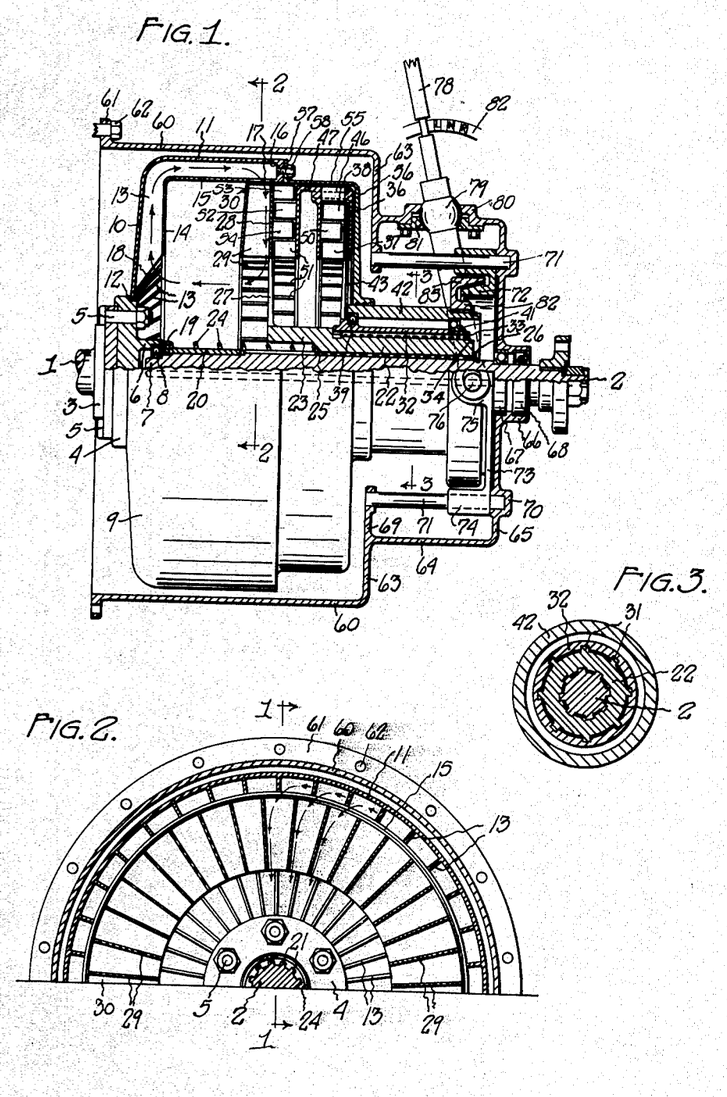
Fig. 1 is a longitudinal sectional view of the device, taken on line 1—1 of Fig. 2, and illustrating adjustment of the device in the unit ratio or coupling stage.
Fig. 2 is a fragmentary transverse sectional view taken on line 2—2 of Fig. 1.
Fig. 3 is a transverse sectional view taken on line 3—3 of Fig. 1.

When the driven shaft has attained predetermined speed, the lever 78 may be shifted to the position illustrated in Fig. 1, whereby spring 24 acts upon the rotor-stator vane assemblies to position the vanes 29 in coplanar relation or registration with impeller outlet passage 17. The rearward movement of the rotor-stator unit is stopped by engagement of sleeve 22 with retainer or stop member 26 at a position holding clutch element 72 spaced from element 85 at the position in which the latter is adjusted by lever 78. In this adjustment, the device has the operating characteristics of a fluid coupling, with a low torque transmission as compared to the torque multiplication stage, but with a substantially one-to-one speed and torque ratio between the driving and driven shafts. Note also that the disengagement of the clutch permits the stator to rotate with the rotor to eliminate liquid drag in the non-registering stages of the unit when the latter become filled with liquid by virtue of centrifugal force. The response of the rotor to speed changes of the impeller is good under normal operating conditions after the driven member has overcome starting inertia, so that slippage at this stage is not excessive. It will be obvious that upon any change in operating conditions where torque requirements of the driven shaft are sharply increased or decreased relative to normal, as in ascending or descending steep mountain grades, the device may be reset at the torque multiplication stage.

Figure 6:
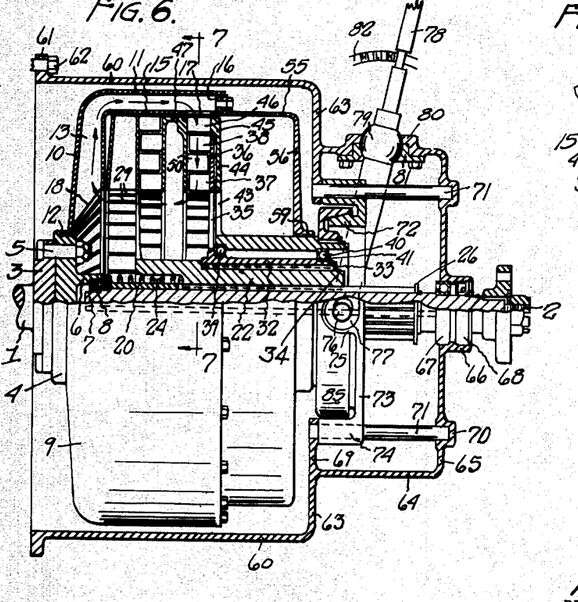
Fig. 6 is a longitudinal sectional view taken on line 6—6 of Fig. 7, and illustrating adjustment of the device in torque multiplying reverse drive stage.
Figure 7:
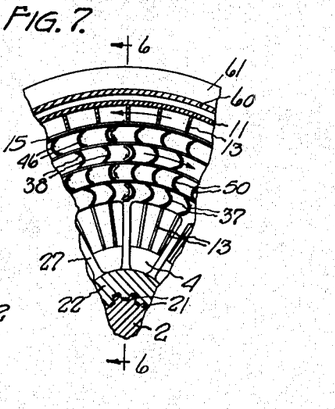
Fig. 7 is a fragmentary transverse sectional view taken on line 7—7 of Fig. 6.
Figures 8, 9:
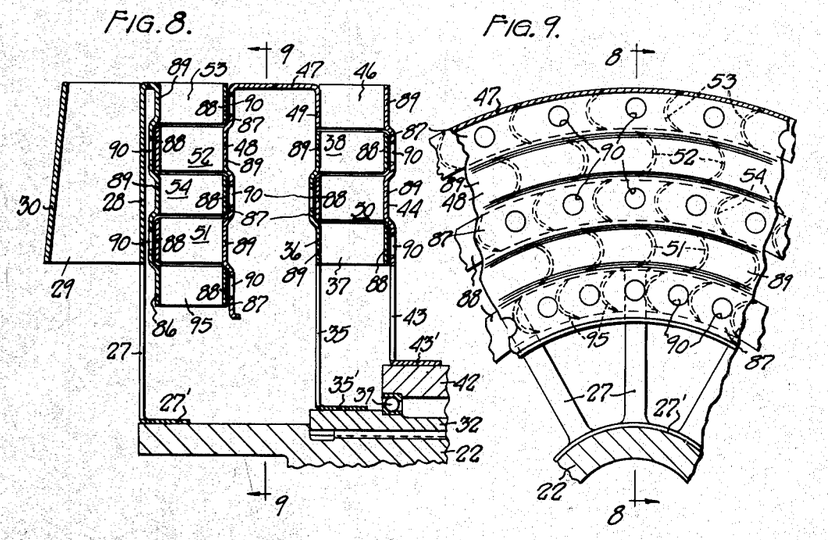
Fig. 8 is an enlarged fragmentary longitudinal sectional view of a modified vane carrier assembly taken on line 8—8 of Fig. 9.
Fig. 9 is a fragmentary transverse sectional view of the vane carrier assembly taken on line 9—9 of Fig. 8.

When it is desired to operate the driven shaft in a reverse direction relative to the driving shaft, the lever 78 is set in the position illustrated in Fig. 6, whereby it shifts the rotor-stator unit forwardly against the action of spring 24, to position vanes 37, 38, 46 and 50 in coplanar relation or registration with impeller outlet passage 17. In this setting or adjustment of the device, the high velocity liquid flow produced by the impeller is directed against the stator vanes 46. The stator vanes 46 change the direction of the flow for driving impingement upon the rotor vanes 38 in a counterrotational direction relative to the impeller. Thereafter the flow is again reversed for impingement on stator vanes 50 which also reverse its direction for impingement on rotor vanes 37. Hence the device achieves reverse drive solely hydraulically, and it is unnecessary to employ reversing gear sets in conjunction therewith as has been customary in most previous fluid drive devices. It will be observed that the vane arrangement of this reverse drive stage of the device is of the torque multiplication type.

Another stage or adjustment of the device for neutral or non-driving relation between the impeller and the rotor can be obtained by shifting lever 78 to a position wherein the portion 47 of the spacer carried by the stator registers with impeller outlet passage 17. Portion 47 serves substantially as a sleeve valve in that position or stage to substantially stop the high velocity flow normally produced by the impeller. The rotative clearance between the interfitting impeller and rotor assemblies prevents the functioning of portion 47 as a true valve; but inasmuch as the operation of the device depends upon transmission of kinetic energy, this positioning of portion 47 does achieve substantial static balance. Consequently, any flow of liquid past the portion 47 to the vane assemblies is ineffective for torque transmission purposes. Thus the device possesses the advantage of a true neutral or non-driving stage, permitting operation of the drive shaft without transmission of torque to the driven member, and without "creeping" of the character which even a low torque transmission would produce.

It will be observed that the shiftable rotor-stator unit is mounted upon spiders which leave the central portion of the device open for its full length, i. e., between front impeller wall 10 and rear chamber wall 56. Hence the liquid in the device may readily be displaced incident to shifting of the rotor-stator unit between the two extremes illustrated in Figs. 1 and 6. The centrifugal action of the device upon liquid trapped between the end walls of the unit and the end walls of the liquid housing assists in maintaining the unit in any position in which it is set. This centrifugal action at the torque multiplication stage or stages of the device presents no problem when the device is operating in coupling stage because the stator is then free to rotate with the rotor; and when the device operates in any other stage, the speed of the rotor is low and the drive stage has torque multiplication characteristics, so that the liquid drag at non-working stages caused by the centrifugal action is small.

Various constructions of the rotor-stator unit to simplify manufacture and assembly, and to relieve static pressure and axial thrust on the shafts, are possible, two of which are illustrated in Figs. 8 and 9, and 10 and 11, respectively. In the construction illustrated Figs. 8 and 9, the vane carriers comprise metal stampings. Stator carrier 44 has portions thereof cut away to define the radial arms 43, and has a central cylindrical hub portion 43' which is welded or otherwise secured on sleeve 42. Rotor carrier 36 has portions cut away to define radial arms 35, and has a central cylindrical hub portion 35' which is welded or otherwise secured on sleeve 32. Rotor carrier 28 has portions cut away to define radial arms 27, and has a central cylindrical hub portion 27' which is welded or otherwise secured on sleeve 22. Spacer 47, 48, 49 is preferably formed in two parts, welded together, and portion 49 is preferably a narrow ring of a width equal to the radial dimension of vanes 46. A ring 86 is welded or otherwise secured to carrier 28 and is positioned in spaced relation thereto. Each of the members 44, 36, 48 and 86 is provided with concentric off-sets 87, adapted to receive therein, with a rotative clearance, a ring 88 whose inner face is flush with the inner faces of the vane carrying portions 89 of said members. The concentric offsets 87 are each provided with a series of spaced pressure relieving openings 90 therein.

Figure 10:
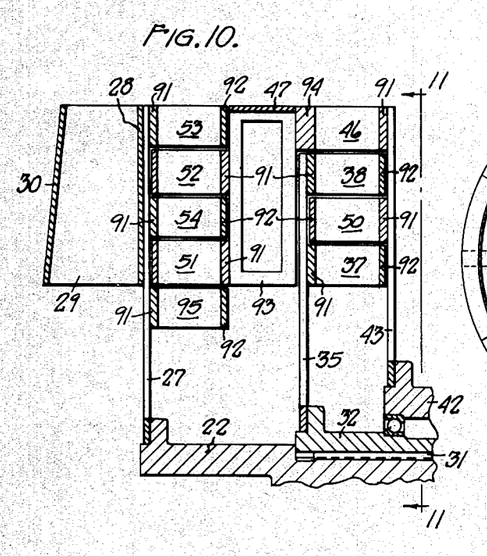
Fig. 10 is an enlarged fragmentary longitudinal sectional view of a modified construction of the vane carrier assembly, taken on line 10—10 of Fig. 11.
Figure 11:
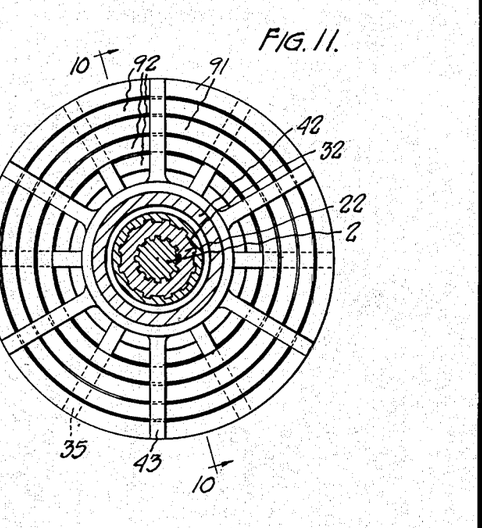
Fig. 11 is a transverse sectional view, taken on line 11—11 of Fig. 10, and drawn on a reduced scale.

In the construction illustrated in Figs. 10 and 11, the radial arms 27, 35 and 43 constitute parts of spiders which are fixedly secured to the sleeves 22, 32 and 42, respectively, and extend to the outer diameter of the respective vane carrying units. These arms have welded thereto a plurality of concentric rings 91 to which the circumferential series of vanes carried thereby are fixedly secured. The opposite ends of the vanes of each series are fixedly secured to rings 92 of thinner section than rings 91 and having a rotative clearance with said rings 91 and the radial arms mounting them. The spacer between the two torque multiplication stages may constitute a plurality of rigid radial bars or frames 93 mounted upon a ring 94 secured to vanes 46 and of a thickness greater than the combined thicknesses of ring 91 and arm 35, whereby said spacer bars 93 and arms 35 have rotative clearance. The Figs. 8 and 10 constructions also illustrate the provisions of a third set of rotor vanes 95 in the forward torque multiplication stage mounted upon the carriers 86 and 27, respectively.

Figure 12:
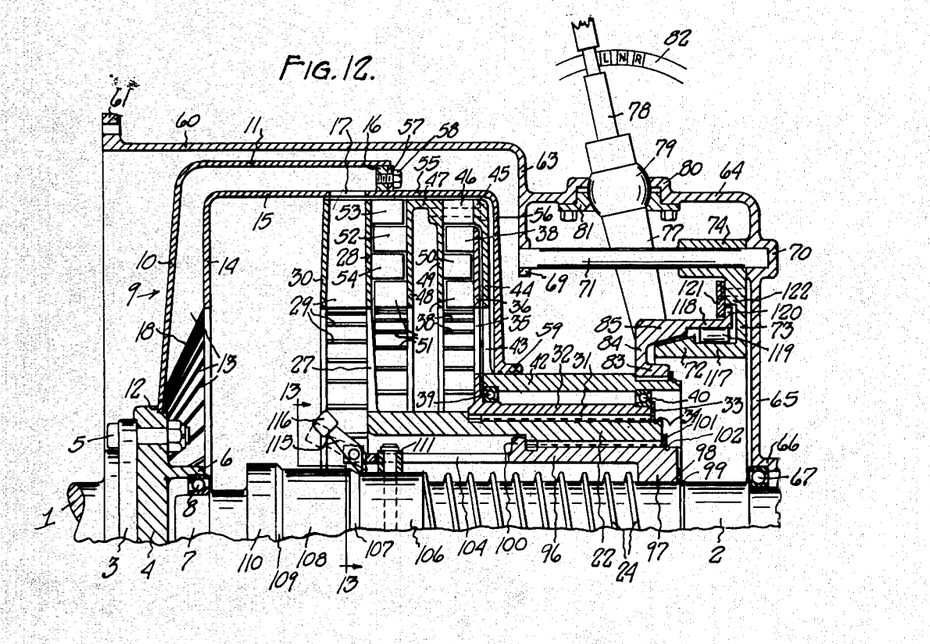
Fig. 12 is an enlarged longitudinal sectional view of the device, similar to Fig. 1, and illustrating means for automatically controlling the position of the vane carrier assembly between the coupling and torque multiplication stages in forward drive.
Figure 13:
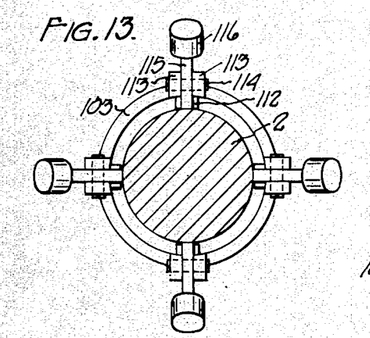
Fig. 13 is a transverse sectional view taken on line 13—13 of Fig. 12.
Figure 14:
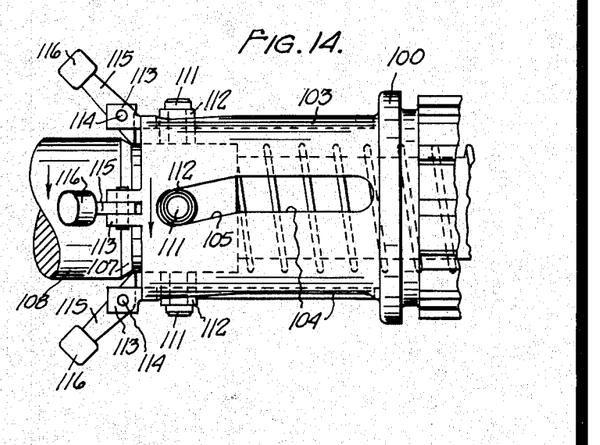
Fig. 14 is a fragmentary side view of the automatic forward drive stage shifting means.

The device may be provided with means responsive to the torque requirements or the speed of the driven shaft, for automatically shifting the rotor-stator unit between torque multiplication and unit ratio stages of operation in forward drive. One embodiment of the device provided with such means is illustrated in Figs. 12–14. In this construction a sleeve 96 has a reduced diameter portion 97 at its outer end journaled and longitudinally slidable upon driven shaft 2 and normally bearing against a stop ring 98 held in place by a split ring 99 seated in a circumferential groove in shaft 2. The outer end of the outer periphery of sleeve 96 is splined to mount internally splined sleeve 22 which is received between an outwardly projecting integral collar 100 on sleeve 96 and a retainer ring 101 locked in place by split ring 102. The portion 103 of sleeve 96 extending forwardly from shoulder 100 is of reduced outer diameter, and has a plurality of equi-spaced slots formed therein of a length greater than the full range of axial adjustment or throw of the rotor-stator unit. Each slot has an elongated longitudinally extending portion 104 and a forward portion 105 extending at an angle to portion 104 in forward drive rotational direction. Shaft 2 has a contoured enlarged portion adjacent its forward end including an enlarged substantially cylindrical portion 106, a frusto-conical ramp portion 107 having a sufficient length and taper to initially resist longitudinal movement of the rotor-stator unit by lever 78 or otherwise, a substantially cylindrical intermediate portion 108 of a larger diameter than portion 106, and of a length slightly less than the longitudinal spacing between rings 28 and 49, a sharply tapered enlarged ramp portion 109 and a forward enlarged portion 110. Coil spring 24 bears against sleeve portion 97 and shaft portion 106 at its opposite ends. A plurality of radial studs 111 project from shaft portion 106 and mount bearings 112 having a snug rotating fit within one of the slots 104, 105.

In the operation of the device, lever 78 is set in a forward drive position, free to swing between torque multiplication and unit ratio stages of operation. Assuming that said lever has been set in unit ratio operative position, as illustrated in Fig. 12, when the driven shaft 2 is stationary, a high torque requirement will exist in shaft 2. Hence, as torque is transmitted to the rotor by the impeller which does not meet the torque requirement of shaft 2, the resulting rotation of the rotor in the direction of the arrow, Fig. 14, will cause a cam reaction between angular slot portions 105 of sleeve 96 and the rollers 112 which are subject to the inertia or torque requirements of the shaft 2. This cam reaction will be converted into longitudinal forward movement of sleeve 96 and the rotor-stator unit to shift the latter until the torque multiplication stage registers with impeller passage 17. The slot portion 105 is of a length to accurately correspond with the rotor-stator movement between torque multiplication and unit ratio stages of operation, whereby the roller will seat in the forward end of slot portion 104 when the torque multiplication stage registers with impeller outlet 17, and longitudinal movement of sleeve 96 stops. This automatic torque responsive position selection is resisted by spring 24, and said spring insures that longitudinal movement of said sleeve will stop when roller 112 seats at the junction of slot portions 104, 105. Thereafter, as the operation of the device produces a transmission or torque satisfying the torque requirements of shaft 2, the spring 24 urges the sleeve 96 rearwardly to shift the rotor-stator unit for registration of the unit ratio stage with impeller outlet 17. Thus, automatic operation of the device by selection, responsive to the torque requirements of the driven shaft, of the stage of device required for efficient operation, is achieved by simple means.

It is also desirable to provide the automatic type of device above described with means safeguarding its proper operation, and particularly means which will prevent automatic stage adjustment at high speeds upon sharp acceleration of the drive engine and will resist improper manual operation by the operator. One type of such means is illustrated in Figs. 12–14 and comprises centrifugally responsive means adapted to frictionally engage the ramp 107 of the driven shaft to resist longitudinal shifting of the rotor-stator unit during high speed operation. As illustrated, a plurality of equi-spaced pairs of radially positioned spaced ears 113 project longitudinally from the forward end of sleeve 96. Ears 113 mount transverse studs 114 therebetween, upon which are pivotally mounted rigid levers 115 which carry weights 116 at their outer ends. The inner ends of levers 115 constitute friction members adapted to bear upon the enlarged forward end portion of the driven shaft. When the rotor-stator unit is at rest, the levers 115 are free to assume their natural individual positions and are substantially inoperative, so that the rotor-stator unit may be shifted longitudinally by lever 78 without interference from said levers. When the rotor and its mounting sleeve 96 rotates, the weights 116 and levers 115 act as governors, whereby a frictional pressure proportional to the speed of rotation is exerted by levers 115 upon shaft 2. Thus, if the device is operating at high speed in unit ratio stage, and assuming no torque requirement of the driven shaft greater than a certain predetermined minimum, or, alternatively, assuming the speed of the driven shaft exceeds a predetermined maximum above which it is undesirable for an engine to drive the driven shaft in torque multiplication stage, movement of the rotor-stator unit is not desirable and should be avoided. The centrifugal pressure or frictional engagement of lever 115 upon ramp 107 serves to resist movement of the rotor-stator unit in both of the aforesaid assumed conditions. Likewise, if the operator attempts to operate lever 78 to condition the device in reverse driving stage while the device is operating at substantial speed in forward drive direction, the engagement of levers 115 with steep ramp 109 will positively prevent such adjustment of lever 78.

Where the automatic feature of the device is incorporated, it is advisable to use a one-way clutch. Thus, I have illustrated in Fig. 12 the formation of the clutch to provide an inner cylindrical race 117 between the inner clutch element 72 and its support 73 and an outer cylindrical race 118 projecting from the rear end of outer clutch element 85 and encircling race 117. Rollers 119 are interposed between these races. Outer race 118 is preferably provided with an outwardly projecting flange 120 which fits freely in an annular groove in clutch support 73 to limit relative axial movement of the clutch parts. As here illustrated, the groove is formed by securing a ring 121 on an increased thickness annular portion 122 of support 72.

It will be observed that the automatic type of the device entails application of adjusting torque at pins 111 and rollers 112, rather than at the clutch. This necessitates provision for free rotation of the clutch to counteract the tendency of the rotor assembly to create a liquid drag when in coupling or unit ratio driving stage and the automatic stage selector is operating to select torque multiplication stage. Hence the stator is temporarily permitted by the one-way clutch to rotate with the rotor, but is prevented by the one-way clutch from rotation in reverse direction, thereby providing a reaction point to replace the action of the cone clutch.

It will be understood that the construction of the device herein described and illustrated is illustrative, and constitutes one embodiment of my invention. The construction is susceptible of change within the scope of the appended claims without departing from the spirit of the invention. Also, the number of the stages of the device is subject to variation to meet the operating requirements of the device. For example, two or more torque multiplication stages having different multiplication ratios may be provided for either or both of forward and reverse driving operations.

I claim:

1. In combination, a stationary housing, a driving shaft, a liquid confining casing carried by said shaft, an impeller fixed in said casing and including a plurality of circularly arranged radial passages open at their inner ends and terminating in longitudinal outer portions, said passages having circumferentially arranged inwardly directed outlets in the impeller outer portion, a driven shaft coaxial with said driving shaft and projecting into said casing, a rotor in said casing longitudinally slidable on and keyed to said driven shaft, a set of circularly arranged substantally radial vanes carried by said rotor and defining one fluid reaction stage, a plurality of longitudinally and radially spaced annular sets of curved vanes carried by said rotor, a stator element journaled on said rotor and journaling and projecting slidably into said casing, a plurality of longitudinally and radially spaced annular sets of curved vanes in oppositely facing relation to and interposed between said sets of curved rotor vanes, said curved vanes defining additional fluid reaction stages juxtaposed to said first stage and to each other, and means for longitudinally shifting said rotor and stator as a unit for selective registration of one of said reaction stages with said impeller outlets and an axially shifted brake disengaged when first named stage registers with said impeller outlets and engaged at all other positions of said rotor and stator, said brake including a part fixed on said stator and a nonrotatable part slidable in said housing.

2. A liquid drive transmission between a driving and a driven shaft, comprising an impeller unit on said driving shaft having an annular outlet, a driven unit mounted on said driven shaft juxtaposed to said impeller outlet and including a rotor and a stator cooperating to provide longitudinally spaced coupling and converter stages, selector means for directing liquid flow between said units through a selected stage of said driven unit, a one-way clutch associated with said stator, and control means responsive to the speed and torque requirements of said driven shaft for actuating said selector means and said clutch.

3. A liquid drive transmission between a driving and a driven shaft, comprising an impeller unit on said driving shaft having an annular outlet, a rotor-stator unit mounted on said driven shaft juxtaposed to said impeller outlet and including longitudinally spaced coupling and converter stages, selector means for directing liquid flow between said units through a selected stage of said rotor-stator unit, and control means responsive to the speed and the torque requirement of the driven shaft for actuating said selector means.

4. A liquid drive transmission between a driving and a driven shaft, comprising an impeller unit on said driving shaft having an annular outlet, a driven unit juxtaposed to said impeller outlet and including a rotor and a stator cooperating to provide longitudinally spaced coupling and converter stages, said driven unit including a sleeve journaled and longitudinally shiftable on said driven shaft and having a helical slot therein, a pin projecting transversely from said driven shaft and seating in said slot, a spring normally urging said driven unit to a position wherein said coupling stage registers with said impeller passage, centrifugal means on the driven shaft for restraining shifting of said sleeve in one direction, and a one-way clutch associated with said stator and controlled by the direction of fluid reaction at said driven unit.

5. A liquid drive transmission between a driving and a driven shaft, comprising an impeller unit on said driving shaft having an annular outlet, a driven unit juxtaposed to said impeller outlet and including a rotor and a stator cooperating to provide longitudinally separated coupling and converter stages, said driven unit being journaled and longitudinally shiftable on said driven shaft, a helical guide element on said driven unit, a connector on said driven shaft engaging said guide, spring means normally urging said driven unit to a position wherein said coupling stage registers with said impeller outlet, and a one-way clutch for said stator responsive to the direction of fluid reaction at said driven unit.

6. A liquid drive transmission between a driving and a driven shaft, comprising an impeller unit on said driving shaft having an annular outlet, a rotor-stator unit juxtaposed to said impeller outlet and having longitudinally separated forward coupling and converter stages and a reverse stage, said rotor-stator unit being journaled and longitudinally shiftable on said driven shaft, a selector for positioning said rotor-stator unit in either of forward and reverse drive relations, control means responsive to the torque requirements of said driven shaft for positioning said rotor-stator unit relative to said impeller outlet when in forward drive relation, and means responsive to the speed of said driven shaft for restraining operation of said selector.

7. A liquid drive transmission between a driving and a driven shaft, comprising an impeller unit on said driving shaft having an annular outlet, a rotor-stator unit on said driven shaft juxtaposed to said impeller outlet and having a plurality of reaction stages including forward coupling and converter stages, a selector associated with one of said units for directing liquid flow between said units through one of a selected group of reaction stages, control means responsive to the torque requirements of said driven shaft for positioning said selector for liquid flow through a selected one of said selected group of stages, and means responsive to the speed of the driven shaft and adapted to restrain operation of said selector.

ALFRED B. SIBERT.